US012699132B1

(12) United States Patent
Carlson

(10) Patent No.: US 12,699,132 B1
(45) Date of Patent: Aug. 4, 2026

(54) BUILT-IN SELF-TEST FOR ON-CHIP ERROR DETECTION

(71) Applicant: Auradine, Inc., Santa Clara, CA (US)

(72) Inventor: David Carlson, Haslet, TX (US)

(73) Assignee: Auradine, Inc., Santa Clara, CA (US)

( * ) Notice: Subject to any disclaimer, the term of this patent is extended or adjusted under 35 U.S.C. 154(b) by 0 days.

(21) Appl. No.: 19/316,494

(22) Filed: Sep. 2, 2025

(51) Int. Cl.
*G01R 31/317* (2006.01)
*H04L 9/06* (2006.01)

(52) U.S. Cl.
CPC ...... *G01R 31/31724* (2013.01); *H04L 9/0643* (2013.01)

(58) Field of Classification Search
CPC .......................... G01R 31/31724; H04L 9/0643
See application file for complete search history.

(56) References Cited

U.S. PATENT DOCUMENTS 11,438,142 B1 * 9/2022 Carlson .............. G06Q 20/0658
12,200,139 B1 * 1/2025 Tomei ................... H04L 9/3236

2018/0006808 A1 * 1/2018 Suresh .................. H04L 9/0643
2019/0332818 A1 * 10/2019 Rodriguez De Castro ..................
            G06F 12/1408
2022/0006641 A1 * 1/2022 Snow .................... H04L 9/0869
2022/0263648 A1 * 8/2022 Mai ............................ H04L 9/14
2025/0080334 A1 * 3/2025 Saarinen ............... H04L 9/0897

* cited by examiner

*Primary Examiner* — Albert Decady
*Assistant Examiner* — Enamul M Kabir
(74) *Attorney, Agent, or Firm* — Fish & Richardson P.C.

(57) ABSTRACT

The present disclosure generally relates to using built-in self-test (BIST) for on-chip error detection. In some aspects, a method includes receiving information about one or more parameters for a built-in self-test (BIST) operation, generating a nonce for each iteration of the BIST operation according to the one or more parameters, and computing a hash value for each iteration of the BIST operation using the nonce as an input to a cryptographic hash function. The method further includes transmitting, to multiple hash engines, information about the nonce and the hash value for each iteration of the BIST operation. The method further includes receiving, from each hash engine, a response with information indicating a number of correct results computed by that hash engine. The method further includes comparing the indicated number of correct results to an expected number of correct results for the BIST operation.

29 Claims, 6 Drawing Sheets

RECEIVE INFORMATION ABOUT PARAMETERS FOR BIST OPERATION — 402

GENERATE NONCE FOR EACH ITERATION — 404

COMPUTE HASH VALUE BASED ON NONCE — 406

TRANSMIT NONCE AND HASH VALUE TO EACH HASH ENGINE — 408

RECEIVE INFORMATION INDICATING CORRECT RESULTS FROM EACH HASH ENGINE — 410

COMPARE INDICATED NUMBER OF CORRECT RESULTS TO EXPECTED NUMBER OF CORRECT RESULTS — 412

RECEIVE INFORMATION ABOUT NONCE AND HASH VALUE FROM CONTROLLER ⌇502

INSERT NONCE INTO DATA PIPELINE ⌇504

RECEIVE OUTPUT FROM DATA PIPELINE ⌇506

COMPARE RESULT TO HASH VALUE ⌇508

DETERMINE NUMBER OF CORRECT RESULTS ⌇510

TRANSMIT INFORMATION INDICATING CORRECT RESULTS TO CONTROLLER ⌇512

BUILT-IN SELF-TEST FOR ON-CHIP ERROR DETECTION

TECHNICAL FIELD

The present disclosure generally relates to signal processing and power control. Some aspects of the present disclosure relate to electronic circuits and communications between electronic components, including built-in self-test (BIST) for on-chip error detection.

BACKGROUND

An electronic circuit may be configured to perform cryptographic operations, e.g., a blockchain mining process, using various chips. The electronic circuit may be deployed for applications that rely on blockchain mining, e.g., for cryptocurrency mining, maintaining linked records of digital transactions, etc. The cryptographic operations can include finding a hash value (a unique string of numbers and letters) for a block of transaction data that meets a specific target set by the network's difficulty level. This process can involve testing billions of possible values (nonces) until a valid hash is found.

SUMMARY

One aspect of the present disclosure relates to a method that includes: receiving information about one or more parameters for a built-in self-test (BIST) operation; generating a nonce for each iteration of the BIST operation according to the one or more parameters; computing a hash value for each iteration of the BIST operation using the nonce as an input to a cryptographic hash function; transmitting, to a set of hash engines, information about the nonce and the hash value for each iteration of the BIST operation; receiving, from each hash engine in the set of hash engines, a response with information indicating a number of correct results computed by the hash engine; and comparing the indicated number of correct results to an expected number of correct results for the BIST operation.

In some implementations, the cryptographic hash function includes one of 256-bit secure hashing algorithm (SHA-256), SHA-1, MD5, SHA-3, SHA-512, BLAKE2, or BLAKE3.

In some implementations, the nonce includes one of a 16-bit integer, a 32-bit integer, or a 64-bit integer.

In some implementations, the BIST operation includes a set of iterations, and where the one or more parameters indicate a number of iterations for the BIST operation.

In some implementations, the nonce is generated by a state machine of an application-specific integrated circuit (ASIC) including the set of hash engines.

In some implementations, the method further includes determining the expected number of correct results for the BIST operation based on a number of hash engines on the ASIC and a number of iterations associated with the BIST operation.

In some implementations, the method further includes summing the number of correct results computed by each hash engine to determine a cumulative number of correct results computed by the set of hash engines.

In some implementations, the method further includes determining a hit rate of the ASIC based on the cumulative number of correct results computed by the set of hash engines.

In some implementations, the method further includes adjusting at least one of an operating voltage, a clock frequency, or a clock cycle of the ASIC based on the determined hit rate.

In some implementations, the information about the nonce and the hash value is transmitted in parallel to each of the set of hash engines.

Another aspect of the present disclosure relates to a method that includes: receiving, from a controller, information about a nonce and a hash value for each iteration of a BIST operation; inserting the nonce into a data pipeline of a hash engine; receiving an output value from the data pipeline into which the nonce was inserted; comparing the output value to the hash value provided by the controller; determining a number of correct results computed by the hash engine during the BIST operation based on comparing the output value to the hash value provided by the controller; and transmitting, to the controller, a response with information indicating the number of correct results computed by the hash engine during the BIST operation. In some implementations, the data pipeline is configured to execute a cryptographic hash function using the nonce as an input.

In some implementations, the cryptographic hash function includes one of SHA-256, SHA-1, MD5, SHA-3, SHA-512, BLAKE2, or BLAKE3.

In some implementations, the nonce includes one of a 16-bit integer, a 32-bit integer, or a 64-bit integer.

In some implementations, the BIST operation includes a set of iterations.

In some implementations, the nonce is generated by a state machine of an ASIC including the hash engine.

Another aspect of the present disclosure relates to an electronic circuit including: a set of hash engines; and a controller coupled to the set of hash engines and configured to perform operations including: receiving an indication of one or more parameters for a BIST operation; generating a nonce for each iteration of the BIST operation according to the one or more parameters; computing a hash value for each iteration of the BIST operation using the nonce as an input to a cryptographic hash function; transmitting, to a set of hash engines, information about the nonce and the hash value for each iteration of the BIST operation; receiving, from each hash engine in the set of hash engines, a response with information indicating a number of correct results computed by the hash engine; and comparing the indicated number of correct results to an expected number of correct results for the BIST operation.

In some implementations, the cryptographic hash function includes one of SHA-256, SHA-1, MD5, SHA-3, SHA-512, BLAKE2, or BLAKE3.

In some implementations, the nonce includes one of a 16-bit integer, a 32-bit integer, or a 64-bit integer.

In some implementations, the BIST operation includes a set of iterations, and where the one or more parameters indicate a number of iterations for the BIST operation.

In some implementations, the nonce is generated by a state machine of an ASIC including the set of hash engines.

In some implementations, the operations further include determining the expected number of correct results for the BIST operation based on a number of hash engines on the ASIC and a number of iterations associated with the BIST operation.

In some implementations, the operations further include summing the number of correct results computed by each hash engine to determine a cumulative number of correct results computed by the set of hash engines.

In some implementations, the electronic circuit further includes determining a respective health status of each hash engine based on the indicated number of correct results computed by the hash engine.

In some implementations, the information about the nonce and the hash value is transmitted in parallel to each of the set of hash engines.

Another aspect of the present disclosure relates to an electronic circuit configured to perform operations including: receiving, from a controller, information about a nonce and a hash value for each iteration of a BIST operation; inserting the nonce into a data pipeline of a hash engine, where the data pipeline is configured to execute a cryptographic hash function using the nonce as an input; receiving an output value from the data pipeline into which the nonce was inserted; comparing the output value to the hash value provided by the controller; determining a number of correct results computed by the hash engine during the BIST operation based on comparing the output value to the hash value provided to the controller; and transmitting, to the controller, a response with information indicating the number of correct results computed by the hash engine during the BIST operation.

In some implementations, the cryptographic hash function includes one of SHA-256, SHA-1, MD5, SHA-3, SHA-512, BLAKE2, or BLAKE3, and where the nonce includes one of a 16-bit integer, a 32-bit integer, or a 64-bit integer.

In some implementations, the nonce is generated by a state machine of an ASIC including the hash engine.

The details of one or more embodiments of these systems and methods are set forth in the accompanying drawings and the description below. Other features, objects, and advantages of these systems and methods will be apparent from the description and drawings, and from the claims.

DETAILED DESCRIPTION

A computing system may include a number of application-specific integrated circuits (ASICs) arranged on a printed circuit board (PCB). Each ASIC may include a controller and a number of hash engines (also referred to as miners), where the controller is configured to communicate with the hash engines via one or more buses. Each hash engine may include various electronic components (e.g., latches, flops, transistors, clocks) that are collectively operable to execute a cryptographic hash function, e.g., using 256-bit Secure Hashing Algorithm (SHA-256), or another suitable hashing algorithm. In some implementations, an ASIC may include a large number of hash engines, e.g., 238 engines. Some ASICs (also referred to as chips) may operate in regions of the computing system where a relatively large number of logic errors can occur (which can lead to incorrect SHA-256 results). It may be desirable to know the extent or frequency of such errors. In some cases, this is done by monitoring the output of the ASIC and comparing the number of expected hits (e.g., correct results) to the actual number of hits. However, this approach can be problematic because the difficulty at which the ASIC is reporting hits can be quite high, which means there will be relatively few hits (as more time is needed to collect statistics). This process can take several hours. Also, these hits can occur randomly, which can increase the amount of time needed to complete the diagnostic process.

The present disclosure relates generally to an on-chip built-in self-test (BIST) mechanism that provides similar monitoring and test functionality in a fraction of the time (e.g., milliseconds instead of hours). In accordance with aspects of the present disclosure, a controller of an ASIC may receive (e.g., from software) an indication of how many iterations to run for a BIST operation. An on-chip state machine (e.g., a state machine located on the ASIC) may generate a N-bit nonce (where N is a positive integer, e.g., N=16, 32 or 64) for each iteration of the BIST operation and use the nonce to precompute a SHA-256 result for the present state of the machine. The controller may transmit the precomputed result and the nonce to each hash engine on the ASIC (e.g., 238 engines, each including 4 double-SHA pipelines). Each hash engine may insert the nonce into a data pipeline and compare the output to the precomputed result provided by the controller. The number of correct results computed by each hash engine may be returned to the controller, which keeps track of how many correct results occur chip-wide (e.g., across all hash engines of the ASIC). Software may compare this number to the expected number of correct results (e.g., the number of iterations*the number of SHA-256 engines) to determine the relative health or efficiency of the ASIC.

Figure 1:
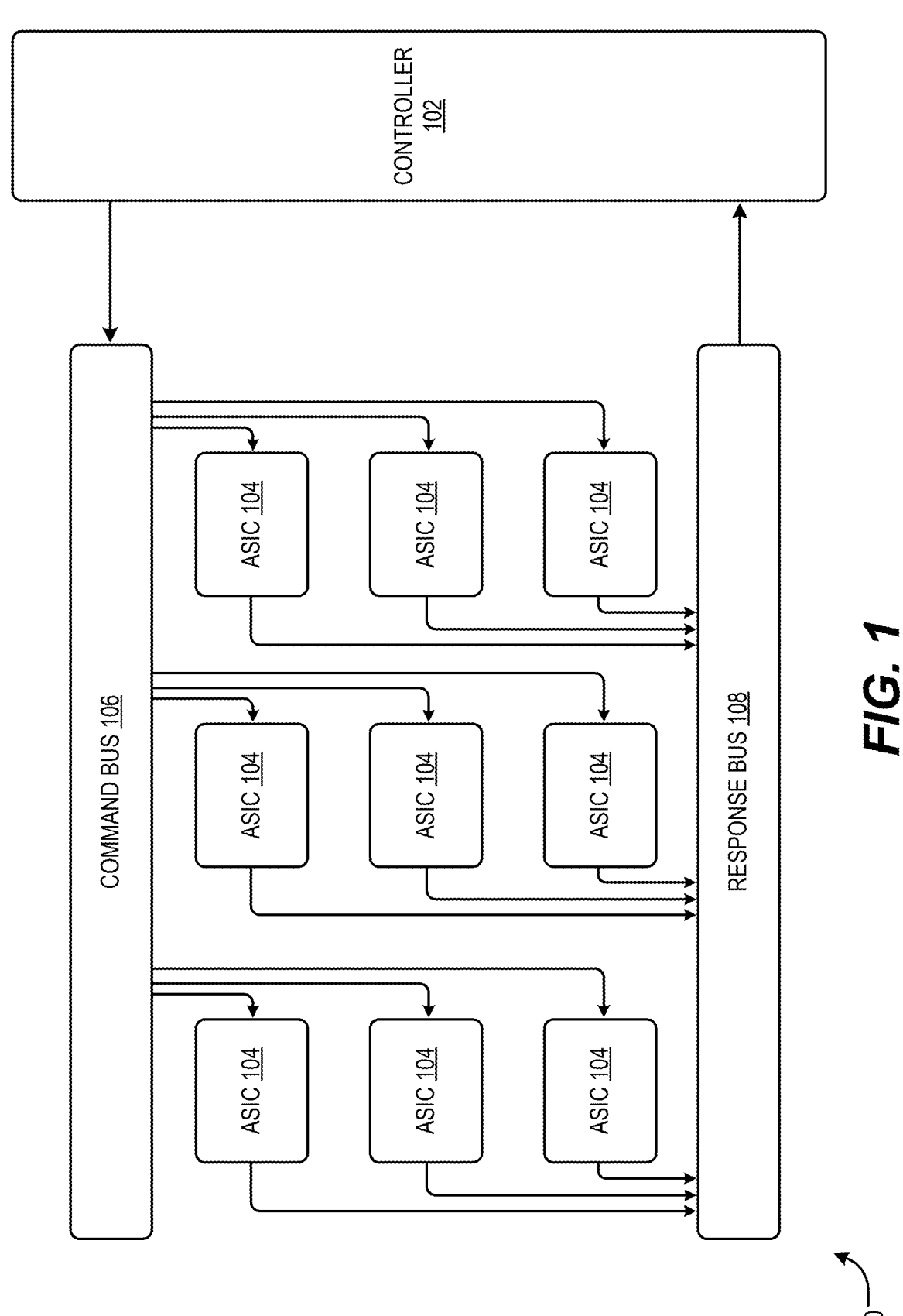
FIG. 1 is a schematic diagram of an example circuit that includes multiple application-specific integrated circuits (ASICs), according to one or more implementations.

FIG. 1 is a schematic diagram of an example electronic circuit 100 that includes multiple ASICs 104, according to one or more implementations. The ASICs 104 can be of any one or more suitable types in various implementations, such as general-purpose processor chips, field-programmable gate array (FPGA) chips, etc. The electronic circuit 100 further includes a controller 102, for example, a central processing unit (CPU), computing device, host device, etc. The electronic circuit 100 can further include multiple buses, such as a command bus 106, a response bus 108, a clock bus, a reset bus, one or more power buses, etc. In some implementations, the ASICs 104, controller 102, command bus 106, response bus 108, a VDD supply, and/or a V2 supply are mounted on/coupled to a common board, e.g., a printed circuit board (PCB). For example, interconnections between the ASICs 104 and/or between the ASICs 104 and other elements (e.g., the controller 102, command bus 106, and/or response bus 108) can include metal traces in and/or on the common board.

Figure 2:
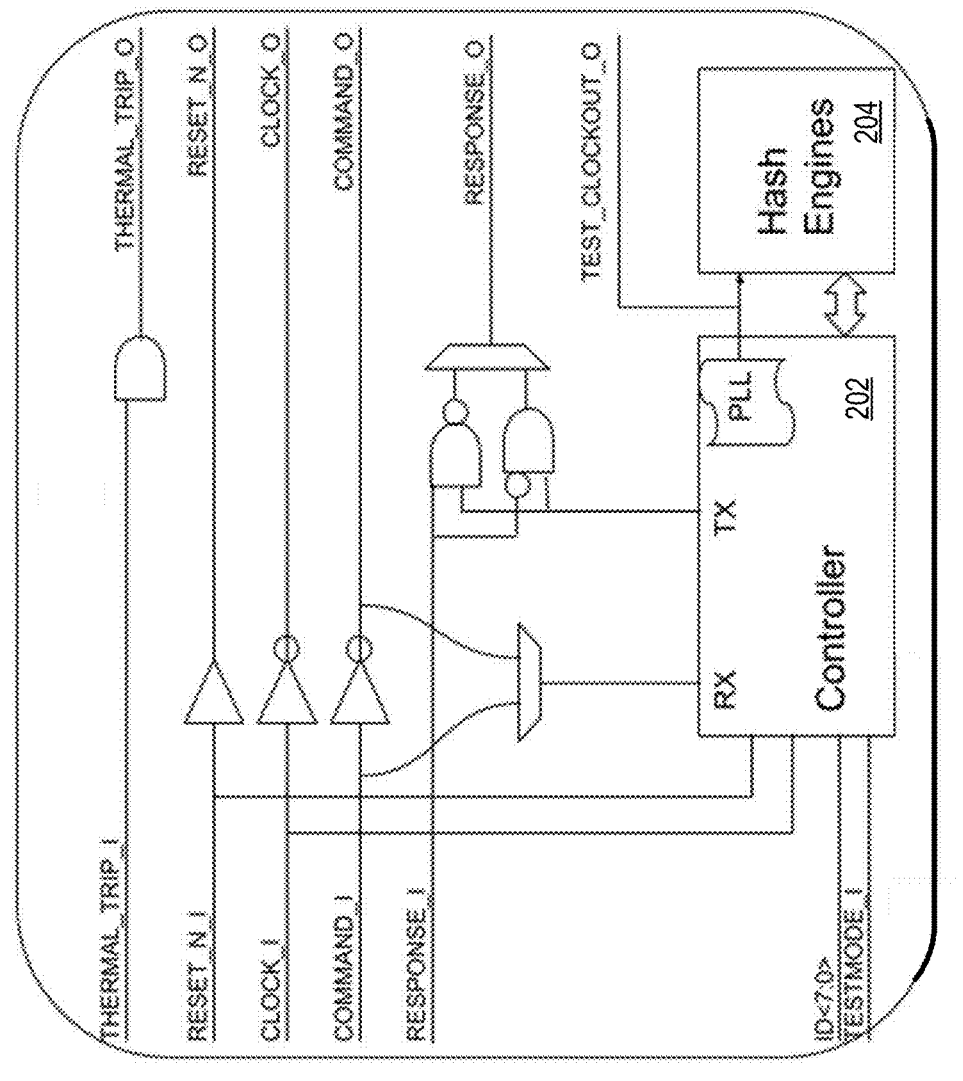
FIG. 2 is a schematic diagram of an example ASIC, according to one or more implementations.

In some implementations, the ASICs 104 and other elements of the electronic circuit 100 are included in a common enclosure, cabinet, and/or case. An example schematic of an ASIC 104 is shown in FIG. 2, as discussed below. In this example, the ASICs 104 are grouped into in three groups (e.g., corresponding to rows or columns in which the ASICs 104 are arranged), each group including three ASICs 104. However, in some implementations, the ASICs 104 are not divided into groups. Moreover, the number of groups and number of ASICs 104 in each group can vary in some implementations.

Each of the ASICs 104 can include terminals (e.g., pins) coupled to one or more of these buses. For example, each of the ASICs 104 can include a control input terminal coupled to the command bus 106, which provides input signals from the controller 102 to each of the ASICs 104. In some implementations, each of the ASICs 104 can include an input terminal coupled to a clock bus for receiving a clock signal, and/or an input terminal coupled to a reset bus for receiving a reset signal.

In some implementations, the controller 102 is on a common board with the ASICs 104. In some implementations, the controller 102 is separated from the ASICs 104, e.g., outside an enclosure housing the ASICs 104. Although the controller 102 is shown as both providing input signals to and receiving output signals from the ASICs 104, separate elements (e.g., separating computing devices) can provide inputs to and receive outputs from the ASICs 104 in some implementations.

The electronic circuit 100 may be configured to perform cryptographic operations, e.g., hash computations for a blockchain mining process, using the ASICs 104. In such cases, the electronic circuit 100 can be deployed for applications that rely on blockchain mining, e.g., for cryptocurrency mining, maintaining linked records of digital transactions, etc. In this context, a blockchain is a decentralized and distributed digital ledger that records units of information, e.g., transactions, across multiple computers or nodes.

In some implementations, the ASICs 104 can be configured or customized to perform computations instructed by the controller 102. For example, the ASICs 104 can receive (e.g., at input terminals) input signals from the controller 102 instructing the ASICs 104 to perform computations for a particular task. After receiving these input signals, each of the ASICs 104 can perform the computations indicated/commanded by the input signal and transmit an output signal (e.g., from an output terminal) to the response bus 108.

In some implementations, the controller 102 is configured to carry out arithmetic and logic operations, data manipulations, and control flow management in accordance with operations of the electronic circuit 100. In some implementations, the controller 102 can include components such as a control unit, an arithmetic logic unit, one or more registers, and one or more caches, etc. The control unit of controller 102 manages the flow of data between different components of the controller 102, and can be configured to fetch instructions from a memory, decode the instructions, and coordinate execution of the instructions. The arithmetic logic unit can be configured to perform arithmetic operations (e.g., addition, subtraction, multiplication, and division), and logical operations (e.g., AND, OR, and NOT) on data. The registers of the controller 102 can be configured to store temporary data, instructions, and intermediate results during processing. The registers can also include a program counter which keeps track of the address of the next instruction to be executed, and general-purpose registers for storing data. The caches of the controller 102 can be configured to temporarily store frequently accessed data and instructions.

In some implementations, the controller 102 is configured to transmit input signals to the ASICs 104 via the command bus 106. The input signals may be provided to the ASICs 104 in parallel. For example, at least some of the ASICs 104 can receive the input signals from the controller 102 (in some cases with intermediate processing such as level-shifting, isolation, etc., as discussed further below), as opposed to from another of the ASICs 104 in a series-configuration "daisy-chained" arrangement in which a signal output of each ASIC 104 is coupled to a signal input of another ASIC 104 in turn. For example, as discussed in further detail below, the controller 102 can provide the input signals for receipt by each of the ASICs 104, and the input signals can include identifier(s) identifying target ASICs 104 to perform operations instructed by the input signals.

The ASICs 104 are electrically connected (with respect to their signal inputs and signal outputs) between the controller 102 (e.g., by a coupling to at least one control bus providing the input signals) and the response bus 108. For example, an output of each ASIC 104 can be electrically connected to or otherwise provided to the response bus 108. In some implementations, the response bus 108 includes an input terminal corresponding to each of the ASICs 104, and the input terminal is connected (in some cases with intermediate processing, such as level-shifting) to the signal output terminal (e.g., output terminal) of the corresponding ASIC 104. In some implementations, each input terminal of the response bus 108 can be arranged/configured to receive an idle signal, or no signal, from the corresponding ASIC 104 when the corresponding ASIC 104 has not obtained a nonce that makes the new block header hash meet the difficulty target, and to receive a series of bits in a pattern that indicates a value of the nonce when the corresponding ASIC 104 has obtained a nonce that makes the new block header hash meet the difficulty target.

Signals exchanged to/from the ASICs 104 can correspond to interconnections, e.g., metal traces, wires, and/or other conductive elements. For example, in some implementations, the electronic circuit 100 includes for each ASIC 104, (i) at least one interconnection electrically coupling a signal input terminal of the ASIC 104 to the controller 102 (in some cases with one or more intermediate elements such as a level-shifter, isolator, etc.), and (ii) at least one interconnection electrically coupling a signal output terminal of the ASIC 104 to the response bus 108 (in some cases with one or more intermediate elements such as a level-shifter, isolator, etc.). As described above, BIST can be used to compute the error rate of each ASIC 104. An improved BIST algorithm is described in greater detail in the following sections.

FIG. 2 is a schematic diagram of an example ASIC 104, according to one or more implementations. The ASIC 104 includes various input and output terminals, including a clock-in terminal ("CLOCK_I") for receiving a clock signal; a command-in terminal ("COMMAND_I") (corresponding to a signal input that receives input signals) for receiving commands (e.g., from the controller 102); and a response-out terminal ("RESPONSE_O") for outputting data, such as data indicative of nonces identified as a result of hash computations. The response-out-terminal can output data to the response bus 108.

Other terminals included in this example of the ASIC 104 include reset-in terminal ("RESET_N_I") for receiving (e.g., from the controller) reset commands that cause the ASIC 104 to reset; a thermal trip-in ("THERMAL_TRIP_I") terminal for receiving thermal trip signals from a thermal trip bus; ID input(s) ("ID<7:0>") for receiving individual addressing/commands; and test mode-in ("TESTMODE_I") for enabling manufacturer test mode. In some implementations, the ASIC 104 is devoid of ID input pins or test mode-in pins, or both.

In some implementations where the ASIC 104 is connected in a series configuration with other ASICs 104, signature ASIC 104 further includes terminals configured to provide signals to or from the other series-connected ASICs 104. Using the output terminals depicted in FIG. 2, thermal trip signals, reset signals, clock signals, command signals, and test clock signals can be provided to a second ASIC 104, which can in turn pass those signals to a third ASIC 104, etc., so that common thermal trip, reset, clock, command, and/or test clock signals are provided, in series, to all ASICs 104 on the board or to a group of ASICs 104. Circuitry of the ASIC 104 can permit signals, including computation results, to be transferred in series between ASICs 104. A response-in ("RESPONSE_I") terminal can be configured to receive output signals, including computation results, from other ASICs 104.

The terminals shown in FIG. 2 are examples, and the ASIC 104 may not include all of the terminals depicted, and/or can include one or more additional terminals. For example, as some of the terminals shown in FIG. 2 are included to facilitate a series-configured arrangement of the ASIC 104 that differs from the parallel-configured arrangement shown in FIG. 1, some of the terminals shown in FIG. 2 can be omitted. For example, response-in ("RESPON-SE_I") terminals are not present in implementations where ASIC 104 is connected in a parallel configuration with other ASICs 104, as shown in FIG. 1. In such implementations, data or other signals output by an ASIC 104 is transmitted to the controller 102 or other external entity via the response bus 108. The ASIC 104 can further include one or more power input terminals, e.g., a first power input terminal for receiving a power voltage from a VDD supply, and one or more second power input terminals for receiving one or more power voltages from a V2 supply.

The ASIC 104 includes a local controller 202 configured to manage and coordinate operations of various components within the ASIC 104. Controller 202 can be configured to serve as an interface between hash engines 204 and other circuits or components of the ASIC 104. In some examples, the controller 202 can be configured to receive an input signal from the signal input, and to transmit a corresponding control signal to the hash engines 204. For example, after receiving a signal from the controller 102, the controller 202 can instruct the hash engines 204 to perform cryptographic hash computations. In some examples, the controller 202 is communicatively coupled to the hash engines 204, and can obtain computation results from the hash engines 204. The controller 202 can transmit the computation results and/or values derived therefrom (e.g., signals indicating obtained nonce values) via the response-out terminal, e.g., as an output signal.

The ASIC 104 includes a number of hash engines 204 (e.g., 238 engines). In some implementations, each hash engine 204 includes hardware components configured to perform cryptographic hash computations. For example, a hash engine 204 can perform cryptographic hash computations using hash function algorithms such as SHA-1, SHA-256, MD5, SHA-3, SHA-512, BLAKE2, BLAKE3, etc.

In some implementations, relatively few signals are provided in/out of the ASIC 104, compared to other chips configured for series operation in which control signals, response signals, etc., from each chip are provided to another chip. For example, in some implementations, the ASIC 104 does not receive/transmit a response-in signal from another chip, a clock-out signal for another chip, a reset-out signal for another chip, and/or a command-out signal for another chip. Correspondingly, in some implementations, the ASIC 104 does not include terminals (shown in FIG. 2) corresponding to these signals, and/or does not include at least some of the indicated circuitry that corresponds to processing these signals. For example, the TX terminal of the controller 202 can be connected directly to the response-out terminal of the ASIC 104. This reduction in terminals and/or circuit elements can, in some cases, provide reduced manufacturing costs and/or simplified chip operation.

The ASIC 104 may be configured for parallel operation in some implementations as described above. For example, the ASIC 104 can be configured to receive reset, clock, and command signals in parallel with other ASICs 104 (e.g., from controller 102, as opposed to from another ASIC 104), and to provide output signals, including computation results, in parallel with other ASICs 104 (e.g., to the response bus 108, as opposed to another ASIC 104). The terminals, elements, and operation of the ASIC 104 can be configured as described for the ASIC 104, except where noted otherwise or suggested otherwise by context. Each of the command-in, clock-in, reset-in, and thermal trip-in terminals can correspond to input terminals (e.g., respective different input terminals), and the response-out terminal can correspond to output terminals.

In some examples, BIST is used to determine the hit rate of the ASIC 104 (e.g., how often the ASIC 104 produces correct mathematical results). The hit rate of the ASIC 104 (e.g., 1−the error rate) may depend on various operating conditions, such as voltage, clock frequency, etc. In some implementations, there is a tradeoff between energy consumption and the error rate of the ASIC 104. Typically, the health (e.g., error rate) of the ASIC 104 is determined by letting the ASIC 104 run for some time. There are counters that keep track of how often a hit (e.g., a candidate hash value meeting a threshold) is found. Based on the clock rate and other operating conditions, an expected number of hits is calculated. The ratio between the actual number of hits and the expected number of hits can serve as a performance/health estimate for the ASIC 104. The voltage of the ASIC 104 can be adjusted accordingly.

In a conventional hashing device, hits can occur every $2^{32}$ operations, so calculating the actual hit rate can be time-consuming. It may be desirable to calculate the actual hit rate faster. To do so, in some implementations, software may loop through a list of fixed nonces (starting from 0). A control section of the ASIC 104 (e.g., controller 202, operating within a high voltage domain with a reliable voltage source) may determine the expected or correct hash value for each particular nonce. The expected answer can be broadcasted to all hash engines 204 (e.g., 238 engines). In some implementations, each hash engine 204 has 8 SHA-256 components, so 8 possible answers (e.g., hash values) are broadcasted to the hash engines 204. Each hash engine 204 may inject a nonce into its data pipeline. At the end of the pipeline, the hash engine 204 checks to see if the correct answer was reached. The hash engine 204 sums up how many correct answers were computed by that specific hash engine 204, and the ASIC 104 sums up the total number of correct answers computed across all hash engines 204. In some implementations, a new nonce is injected every few operations.

The actual hit rate of the ASIC 104 can be determined based on the number of correct hash results computed by the hash engines 204. The voltage to the ASIC 104 can be increased or decreased based on the determined hit rate. For example, if the hit rate is above a threshold, voltage to the ASIC 104 can be decreased or the clock rate may be increased. Likewise, if the hit rate is below a threshold, voltage to the ASIC 104 can be increased or the clock rate may be decreased. In other words, the controller 102 (e.g., software) can perform various actions based on the hit rate of a particular ASIC 104.

In some implementations, the nonce is computed by the controller 202, meaning each ASIC 104 computes its own nonce. In each subsequent iteration, the nonce can be incremented by a step value. The nonce and precomputed result are provided to each hash engine 204, which generates an output value based on the nonce. Responses from the hash engines 204 may be provided to the controller 202 via respective serial buses (e.g., 238 serial buses). Each response can include 4 bits indicating the number of correct answers computed by that hash engine 204. The controller 202 may sum these 4-bit responses together and add them to a running counter, which is stored in a register accessible to the controller 102. In turn, the controller 102 can read this register and adjust the clock cycle, frequency, and/or voltage of the ASIC 104 accordingly.

Figure 3:
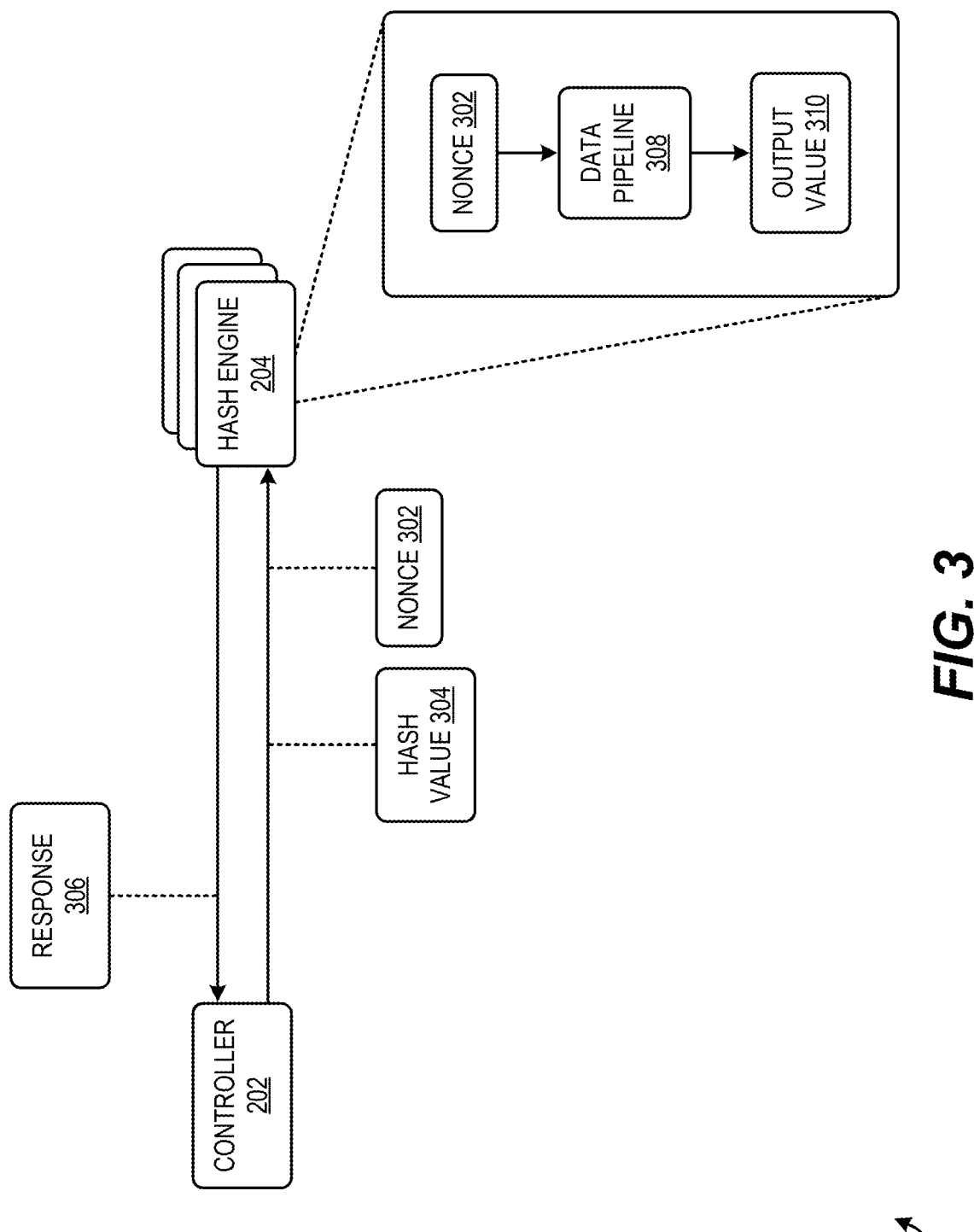
FIG. 3 is a signaling diagram of an example circuit that supports built-in self-test (BIST) for on-chip error detection, according to one or more implementations.

FIG. 3 is a signaling diagram of an example circuit 300 that supports BIST for on-chip error detection, according to one or more implementations. For clarity of presentation, the example circuit 300 of FIG. 3 is generally described in the context of the preceding figures. For example, the example circuit 300 includes a controller 202 and multiple hash engines 204, which may be components of an ASIC 104, as shown and described with reference to FIGS. 1 and 2. Each hash engine 204 includes a data pipeline 308 that computes an output value 310 (e.g., a SHA-256 result) based on a nonce 302. The output value 310 may be compared to a precomputed hash value 304 provided by the controller 202. This process may be repeated several times during a BIST operation. Each hash engine 204 may transmit a response 306 indicating a number of correct results computed by the hash engine 204 during the BIST operation.

Each ASIC 104 may have logic to efficiently test all hash engines 204 in parallel. Having a method to quickly determine engine health can help the ASIC 104 adjust clocks to optimize power. The described techniques can also help identify manufacturing defects in less time, using fewer vectors. The hash engines 204 can be tested using BIST or by examining mission mode results (which could take several billion cycles to get enough hits). Hardware may support different BIST protocols.

In some implementations, BIST is used to detect defects in miners (e.g., hash engines 204). With this approach, a single incorrect operation may result in the miner being labeled defective. Software may send at least two jobs and run BIST at least twice. To do so, software may perform the following operations: clear one or more BIST_RESULT registers; send in a job with all zeroes; write BIST with 256 (e.g., for SHA-256); poll BIST until 0; send in a second job with all ones, and write BIST with 256; and poll BIST until 0. Once complete, the BIST_RESULTS registers will contain the results for each miner. A 1 indicates an error.

In other implementations, BIST is used to determine the hit rate of the chip (e.g., ASIC 104) at the current voltage, temperature, or frequency. To do so, software may clear one or more BIST_GOOD_SAMPLES registers and write BIST with the number of iterations to run. The number of iterations may be at least 1024 to get an adequate sampling. The time required is proportional to the phase-locked loop (PLL) frequency, but 3 μs/iteration or thereabouts is a reasonable time frame in some cases. Software can poll BIST until zero and read the BIST_GOOD_SAMPLES registers. The hit rate will be BIST_GOOD_SAMPLES/(number of miners*8*number of iterations). It may not be necessary to send in a job or ensure that all bits of the input headers are stimulated. After BIST has completed, a nonce exhaust will occur and mining will continue with the prior job.

Internally, BIST operates as follows in some implementations: the nonce counter starts at zero and increments by a given step size. For each iteration, 8 double-SHA operations are performed. The result of each double-SHA may be reduced to 16 bits. The 8 expected BIST results are sent to the appropriate addresses/registers. Once the expected BIST results are sent, the nonce counter is transferred. Writing a particular value will cause the nonce_counter to be used for every miner. Some of the nonce_counter bits may be used as the miner_id for each miner. In turn, each miner will respond with a 5-bit BIST response serial packet. This packet can be sent with the LSB first. In hardware, the control section may wait 192 ref_clk cycles for the response packet.

Figure 4:
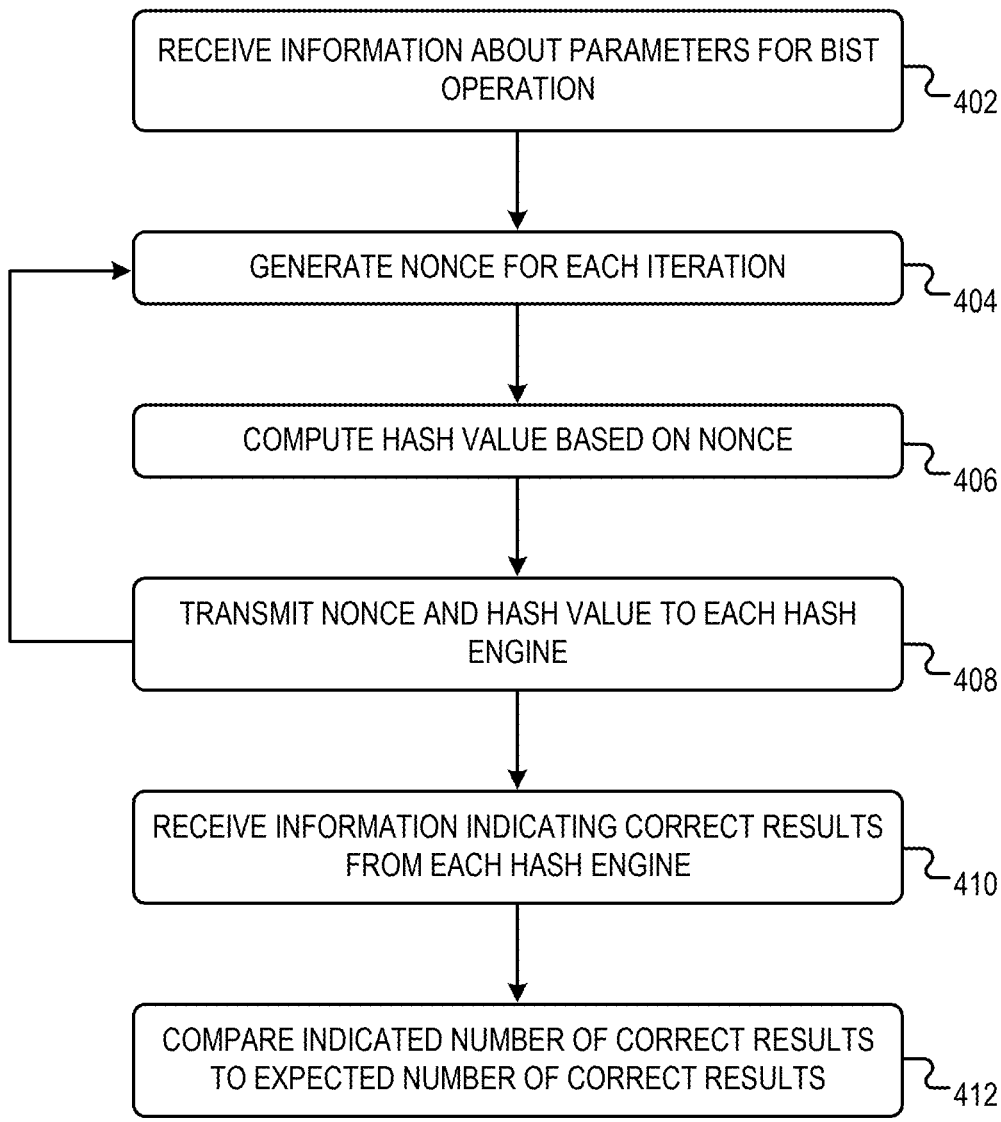
FIGS. 4 and 5 are flowcharts of example methods for on-chip error detection, according to one or more implementations.

FIG. 4 is a flowchart of an example method 400 of using BIST for on-chip error detection, according to one or more implementations. For clarity of presentation, the method 400 is generally described in the context of the preceding figures. For example, the method 400 can be performed by a controller 202 (as shown and described with reference to FIG. 2) or any suitable system, environment, software, hardware, or combination thereof. Some operations of the method 400 can be run in parallel, in combination, in loops, or in any order. The example method 400 can be modified or reconfigured to include additional, fewer, or different steps (not shown in FIG. 4), which can be performed in the order shown or in a different order.

At 402, the controller 202 receives information about one or more parameters for a BIST operation. The one or more parameters may indicate, e.g., a number of iterations for the BIST operation.

At 404, the controller 202 generates a nonce 302 for each iteration of the BIST operation according to the one or more parameters. In some implementations, the nonce 302 is a 32-bit integer.

At 406, the controller 202 computes a hash value 304 for each iteration of the BIST operation using the nonce 302 as an input to a cryptographic hash function (e.g., SHA-256).

At 408, the controller 202 transmits, to multiple hash engines 204, information about the nonce 302 and the hash value 304 for each iteration of the BIST operation. In some implementations, the controller 202 transmits the indication of the nonce 302 and the hash value 304 to each of the hash engines 204 in parallel.

At 410, the controller 202 receives, from each hash engine 204, a response 306 indicating a number of correct results computed by the hash engine 204 during the BIST operation.

At 412, the controller 202 compares the indicated number of correct results to an expected number of correct results for the BIST operation. In some implementations, the expected number of correct results is based on the number of iterations associated with the BIST operation and the number of hash engines 204.

Figure 5:
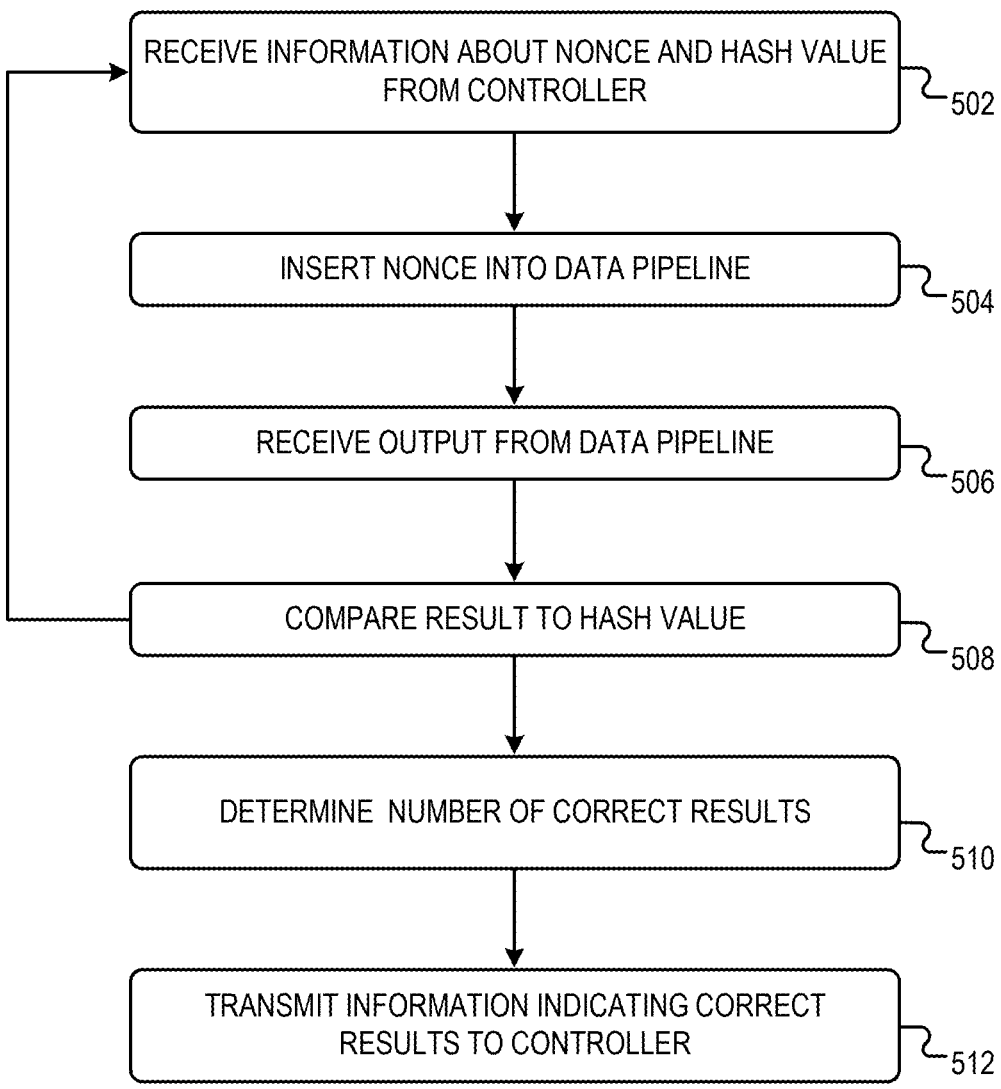

FIG. 5 is a flowchart of an example method 500 of using BIST for on-chip error detection, according to one or more implementations. For clarity of presentation, the method 500 is generally described in the context of the preceding figures. For example, the method 500 can be performed by a hash engine 204 (as shown and described with reference to FIG. 2) or any suitable system, environment, software, hardware, or combination thereof. Some operations of the method 500 can be run in parallel, in combination, in loops, or in any order. The example method 500 can be modified or reconfigured to include additional, fewer, or different steps (not shown in FIG. 5), which can be performed in the order shown or in a different order.

At 502, the hash engine 204 receives, from a controller 202, information about a nonce 302 and a corresponding hash value 304 for each iteration of a BIST operation. In some implementations, the nonce 302 is a 32-bit integer.

At 504, the hash engine 204 inserts the nonce 302 into a data pipeline 308 that is configured to execute a cryptographic hash algorithm (e.g., SHA-256) using the nonce 302 as an input.

At 506, the hash engine 204 receives an output value 310 from the data pipeline 308 into which the nonce 302 was inserted.

At 508, the hash engine 204 compares the output value 310 to the hash value 304 provided by the controller 202.

At 510, the hash engine 204 determines a number of correct results computed by the hash engine 204 during the BIST operation based on comparing the output value 310 to the hash value 304 provided by the controller 202.

At 512, the hash engine 204 transmits, to the controller 202, a response 306 with information about the number of correct results computed by the hash engine 204 during the BIST operation.

Figure 6:
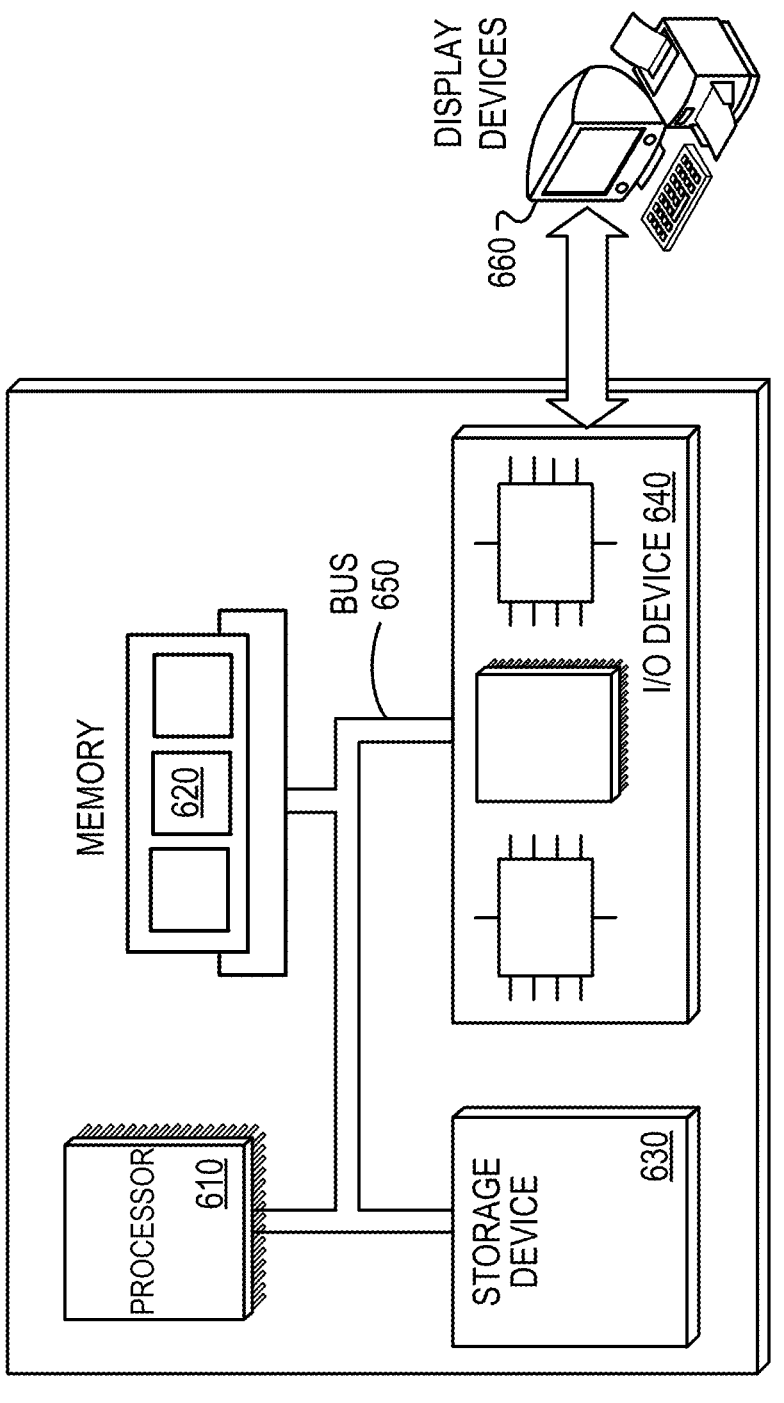
FIG. 6 is a schematic diagram of an example computer system, according to one or more implementations.

FIG. 6 is a schematic diagram of an example computer system 600. In some implementations, the computer system 600 may include or be a part of one or more of the entities described herein. For example, the computer system 600 may implement aspects of the electronic circuit 100 shown and described with reference to FIG. 1. As depicted in FIG. 6, the computer system 600 includes a processor 610, a memory 620, a storage device 630 and an input/output device 640. Each of these components can be interconnected, for example, by a system bus 650. The processor 610 is capable of processing instructions for execution within the computer system 600. In some implementations, the computer system 600 is configured to perform operations of the method 400 and/or the method 500, as shown and described with reference to FIGS. 4 and 5.

In some implementations, the processor 610 is a single-threaded processor, a multi-threaded processor, or another type of processor. The processor 610 is capable of processing instructions stored in the memory 620 or on the storage device 630. The memory 620 and the storage device 630 can store information within the computer system 600. For example, the memory 620 and/or the storage device 630 can store measurement data from one or more sensors as they are received by the control system, as described in the preceding sections. Additionally, or alternatively, the memory 620 and/or the storage device 630 can store historical measurement data. Although the computer system 600 is shown as having one processor 610, one memory 620, and one storage device 630 for illustrative purposes, the computer system 600 can include any number of processors 610, memories 620, and storage devices 630 based on system requirements.

The input/output device 640 provides input/output operations for the computer system 600. In some implementations, the input/output device 640 can include one or more of a network interface device (for example, an Ethernet card), a serial communication device (for example, an RS-232 port), or a wireless interface device (for example, an 502.11 card, a 3G wireless modem, a 4G wireless modem, or a 5G wireless modem), or some combination thereof. In some implementations, the input/output device can include driver devices configured to receive input data and send output data to other input/output devices, for example, a keyboard, printer, and/or display devices 660. In some implementations, mobile computing devices, mobile communication devices, and other devices can also be used.

While the present disclosure describes many examples, these should not be construed as limitations on the scope of an invention that is claimed or of what may be claimed, but rather as descriptions of features specific to particular embodiments. Certain features that are described in the context of separate embodiments can also be implemented in combination in a single embodiment. Conversely, various features that are described in the context of a single embodiment can also be implemented in multiple embodiments separately or in any suitable sub-combination. Although some features may be described as acting in certain combinations and even initially claimed as such, one or more features from a claimed combination in some cases can be excised from the combination, and the claimed combination may be directed to a sub-combination or a variation of a sub-combination. Similarly, while some operations may be depicted in the drawings in a particular order, this should not be understood as requiring that such operations are performed in the particular order shown or in sequential order, or that all illustrated operations be performed, to achieve desirable results.

A number of embodiments have been described. Nevertheless, it is understood that various modifications can be made without departing from the spirit and scope of the present disclosure. Accordingly, other embodiments are within the scope of the following claims.

I claim:

1. A method comprising:
   receiving information about one or more parameters for a built-in self-test (BIST) operation;
   generating a nonce for each iteration of the BIST operation according to the one or more parameters;
   computing a hash value for each iteration of the BIST operation using the nonce as an input to a cryptographic hash function;
   transmitting, to a plurality of hash engines, information about the nonce and the hash value for each iteration of the BIST operation;
   receiving, from each hash engine of the plurality of hash engines, a response with information indicating a number of correct results computed by the hash engine; and
   comparing the indicated number of correct results to an expected number of correct results for the BIST operation.

2. The method of claim 1, wherein the cryptographic hash function is selected from the group consisting of a 256-bit secure hashing algorithm (SHA-256), SHA-1, MD5, SHA-3, SHA-512, BLAKE2, or BLAKE3.

3. The method of claim 1, wherein the nonce is selected from the group consisting of a 16-bit integer, a 32-bit integer, or a 64-bit integer.

4. The method of claim 1, wherein the BIST operation comprises a plurality of iterations, and wherein the one or more parameters indicate a number of iterations for the BIST operation.

5. The method of claim 1, wherein the nonce is generated by a state machine of an application-specific integrated circuit (ASIC) comprising the plurality of hash engines.

6. The method of claim 5, further comprising determining the expected number of correct results for the BIST operation based at least in part on a number of hash engines on the ASIC and a number of iterations associated with the BIST operation.

7. The method of claim 5, further comprising summing the number of correct results computed by each hash engine to determine a cumulative number of correct results computed by the plurality of hash engines.

8. The method of claim 7, further comprising determining a hit rate of the ASIC based at least in part on the cumulative number of correct results computed by the plurality of hash engines.

9. The method of claim 8, further comprising adjusting at least one member selected from the group consisting of an operating voltage, a clock frequency, or a clock cycle of the ASIC based at least in part on the determined hit rate.

10. The method of claim 1, wherein the information about the nonce and the hash value is transmitted in parallel to each of the plurality of hash engines.

11. A method comprising:

receiving, from a controller, information about a nonce and a hash value for each iteration of a BIST operation;

inserting the nonce into a data pipeline of a hash engine;

receiving an output value from the data pipeline into which the nonce was inserted;

comparing the output value to the hash value provided by the controller;

determining a number of correct results computed by the hash engine during the BIST operation based at least in part on comparing the output value to the hash value provided by the controller; and transmitting, to the controller, a response with information indicating the number of correct results computed by the hash engine during the BIST operation.

12. The method of claim 11, wherein the data pipeline is configured to execute a cryptographic hash function using the nonce as an input.

13. The method of claim 12, wherein the cryptographic hash function is selected from the group consisting of SHA-256, SHA-1, MD5, SHA-3, SHA-512, BLAKE2, or BLAKE3.

14. The method of claim 11, wherein the nonce is selected from the group consisting of a 16-bit integer, a 32-bit integer, or a 64-bit integer.

15. The method of claim 11, wherein the BIST operation comprises a plurality of iterations.

16. The method of claim 15, wherein the nonce is generated by a state machine of an ASIC comprising the hash engine.

17. The method of claim 16, wherein the ASIC comprises 238 hash engines.

18. An electronic circuit comprising:

a plurality of hash engines; and a controller coupled to the plurality of hash engines and configured to perform operations comprising:

receiving an indication of one or more parameters for a BIST operation;

generating a nonce for each iteration of the BIST operation according to the one or more parameters;

computing a hash value for each iteration of the BIST operation using the nonce as an input to a cryptographic hash function;

transmitting, to a plurality of hash engines, information about the nonce and the hash value for each iteration of the BIST operation;

receiving, from each hash engine of the plurality of hash engines, a response with information indicating a number of correct results computed by the hash engine; and comparing the indicated number of correct results to an expected number of correct results for the BIST operation.

19. The electronic circuit of claim 18, wherein the cryptographic hash function is selected from the group consisting of SHA-256, SHA-1, MD5, SHA-3, SHA-512, BLAKE2, or BLAKE3.

20. The electronic circuit of claim 18, wherein the nonce is selected from the group consisting of a 16-bit integer, a 32-bit integer, or a 64-bit integer.

21. The electronic circuit of claim 18, wherein the BIST operation comprises a plurality of iterations, and wherein the one or more parameters indicate a number of iterations for the BIST operation.

22. The electronic circuit of claim 18, wherein the nonce is generated by a state machine of an ASIC comprising the plurality of hash engines.

23. The electronic circuit of claim 22, wherein the operations further comprise determining the expected number of correct results for the BIST operation based at least in part on a number of hash engines on the ASIC and a number of iterations associated with the BIST operation.

24. The electronic circuit of claim 18, wherein the operations further comprise summing the number of correct results computed by each hash engine to determine a cumulative number of correct results computed by the plurality of hash engines.

25. The electronic circuit of claim 24, further comprising determining a respective health status of each hash engine based at least in part on the indicated number of correct results computed by the hash engine.

26. The electronic circuit of claim 18, wherein the information about the nonce and the hash value is transmitted in parallel to each of the plurality of hash engines.

27. An electronic circuit configured to perform operations comprising:

receiving, from a controller, information about a nonce and a hash value for each iteration of a BIST operation;

inserting the nonce into a data pipeline of a hash engine, wherein the data pipeline is configured to execute a cryptographic hash function using the nonce as an input;

receiving an output value from the data pipeline into which the nonce was inserted;

comparing the output value to the hash value provided by the controller;

determining a number of correct results computed by the hash engine during the BIST operation based at least in part on comparing the output value to the hash value provided to the controller; and transmitting, to the controller, a response with information indicating the number of correct results computed by the hash engine during the BIST operation.

28. The electronic circuit of claim 27, wherein the cryptographic hash function is selected from the group consisting of SHA-256, SHA-1, MD5, SHA-3, SHA-512, BLAKE2, or BLAKE3, and wherein the nonce is selected from the group consisting of a 16-bit integer, a 32-bit integer, or a 64-bit integer.

29. The electronic circuit of claim 27, wherein the nonce is generated by a state machine of an ASIC comprising the hash engine.

* * * * *